United States Patent [19]

Fukazawa et al.

[11] Patent Number: 4,653,443

[45] Date of Patent: Mar. 31, 1987

[54] THERMOELECTRIC GENERATING COMPOSITE FUNCTIONING APPARATUS

[75] Inventors: Takeshi Fukazawa, Oobu; Hironari Kuno, Tokai; Naoto Okabe, Kariya; Kunihiko Hara, Aichi, all of Japan

[73] Assignee: Nippondenso Co., Ltd., Kariya, Japan

[21] Appl. No.: 678,795

[22] Filed: Dec. 5, 1984

[30] Foreign Application Priority Data

Dec. 16, 1983 [JP] Japan .................. 58-237615

[51] Int. Cl.⁴ .................. F02P 19/02; H01L 35/00
[52] U.S. Cl. .................. 123/145 A; 123/179 B; 136/230; 136/236.1; 219/270; 310/306; 361/264; 374/144; 374/178
[58] Field of Search ............ 310/306; 136/239, 236.1, 136/200, 230; 123/145 A, 179 H, 179 BG, 179 B; 219/270, 267; 361/264; 374/178, 179, 144

[56] References Cited

U.S. PATENT DOCUMENTS

| | | | |
|---|---|---|---|
| 1,422,672 | 7/1922 | Coghlan | 374/144 |
| 2,981,775 | 4/1961 | Bachman | 136/236.1 |
| 3,006,978 | 10/1961 | McGrath et al. | 136/239 |
| 3,524,771 | 8/1970 | Green | 136/239 |
| 3,671,328 | 6/1972 | Dixon et al. | 374/178 |
| 3,921,453 | 11/1975 | Platzer, Jr. | 374/178 |
| 4,203,779 | 5/1980 | Kojima et al. | 136/230 |
| 4,305,287 | 12/1981 | Böhm et al. | 374/144 |
| 4,361,036 | 11/1982 | Levenson | 374/144 |
| 4,512,297 | 4/1985 | Ichikawa et al. | 123/145 A |

FOREIGN PATENT DOCUMENTS 49-53395 5/1974 Japan .

Primary Examiner—Andrew M. Dolinar
Attorney, Agent, or Firm—Cushman, Darby & Cushman

[57] ABSTRACT

A thermoelectric generating composite functioning apparatus used as a glow plug in a diesel engine has sintered semiconductor elements respectively formed in the shape of a bar of N-type and P-type thermoelectric semiconductor materials. The N-type and P-type semiconductor elements are provided oppositely with a gap between them, and their end portions are put in mutual contact to form a P-N junction. A low thermal conductivity insulator is filled in the interval between the N-type and the P-type semiconductor elements. The N-type and P-type semiconductor elements provided in the P-N junction state are contained through the insulator in a housing. Lead terminals connected to the N-type and P-type semiconductor elements are formed in the housing. The apparatus may provide heat to the combustion chamber, or generate electricity from the heat in the combustion chamber.

15 Claims, 5 Drawing Figures

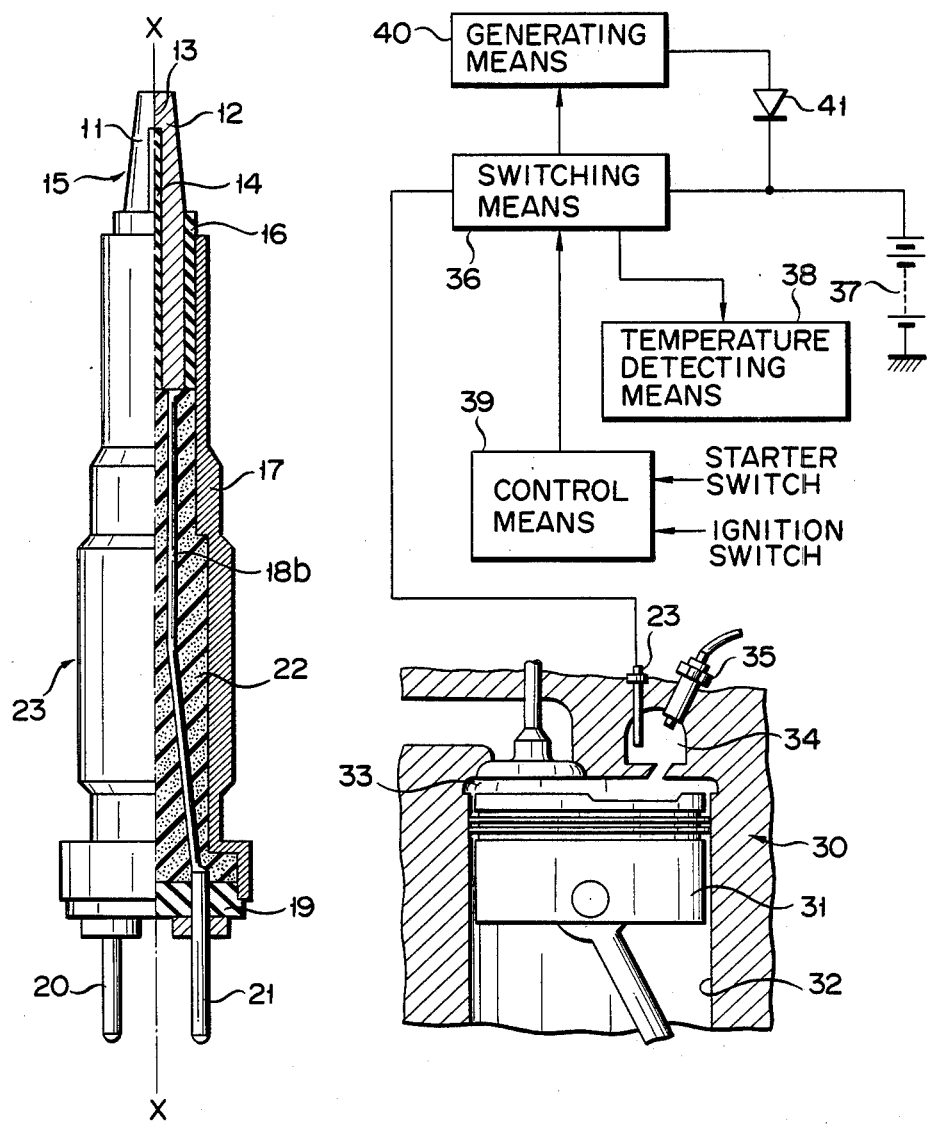

THERMOELECTRIC GENERATING COMPOSITE FUNCTIONING APPARATUS

BACKGROUND OF THE INVENTION

The present invention relates to a thermoelectric generating composite functioning apparatus and, more particularly, to an apparatus for efficiently converting heat generated in an internal combustion engine into electric power, effectively converting heat generated in a diesel engine into electric power to be effectively used as a heating element, thereby effectively utilizing the power in a vehicle engine and also effectively providing a glow plug used for igniting the diesel engine.

Various means for effectively utilizing heat generated in an internal combustion engine have been heretofore considered. For example, as disclosed in Japanese Patent Laid-open No. 53395/1974 official gazette, such a means is constructed so as to generate electric power by utilizing heat generated in the operating state of an internal combustion engine. A thermal contact unit of a thermoelectric generating element is set outside of an enclosure which holds coolant for the engine, while the cold contact unit of the element is set outside of the enclosure. It has also been considered to convert the heat generated in an exhaust manifold into electric power by setting the thermoelectric generating element in the manifold.

However, in this construction the heat of the engine coolant and the heat of the manifold is utilized, and temperature differences cannot be set to a sufficiently large value. Thus, this means cannot function as an efficient mechanism.

It has also been considered to set larger temperature differences by setting such a thermoelectric generating element in a combustion chamber of the engine. However, the cylinder head of the engine should be specially treated in construction so that the thermal contact of the thermoelectric generating element is merely set in the combustion chamber, with the result that the engine should be restricted in its construction.

SUMMARY OF THE INVENTION

It is an object of the present invention to provide a thermoelectric generating composite functioning element capable of efficiently converting heat generated in an internal combustion engine into electric power and also effectively utilizing the element as a heating element.

It is another object of the present invention to provide a thermoelectric generating composite functioning apparatus capable of being used as a glow plug for a diesel engine and utilized as an element for igniting fuel injected into a combustion chamber.

It is still another object of the present invention to provide a thermoelectric generating composite functioning apparatus capable of utilizing the heat generated in the above-described diesel engine after the engine is started, and effectively utilizing the apparatus as a generating power source for various electric devices used in the vehicle.

It is still another object of the invention to provide a thermoelectric generating composite functioning apparatus used as an igniting glow plug in a diesel engine in a vehicle, and also used effectively in combination as a charging power source for a battery carried in the vehicle.

In order to achieve the above and other objects, there is provided, according to the present invention, a thermoelectric generating composite functioning apparatus comprising N-type and P-type thermoelectric generating semiconductors formed in the shape of a bar and put in mutual contact at the end portions, thus forming a P-N junction, with an insulator interposed between the other portions. When heat is supplied to both semiconductors, electric power is generated at the P-N junction. As a result, electric power is generated, whereby the apparatus functions as a thermoelectric generating element.

When the thermoelectric generating composite functioning apparatus thus constructed is supplied with electric power is set in a combustion chamber of a diesel engine, the apparatus operates as a glow plug for preheating the combustion chamber. When the engine enters an operating state, the combustion heat of the engine makes the P-N junction of the thermoelectric generating composite functioning apparatus generate electric power. The generated electric power can be used as charging electric power for the battery and is particularly effective used in a diesel engine carried in the vehicle.

BRIEF DESCRIPTION OF THE DRAWINGS

FIG. 1 is a front view partly in section showing a thermoelectric generating composite functioning apparatus of a first embodiment according to the present invention;

FIG. 2 is a view showing the construction for describing the state of using the thermoelectric generating composite functioning apparatus shown in FIG. 1 in a diesel engine;

DETAILED DESCRIPTION OF THE PREFERRED EMBODIMENTS

Figure 3:
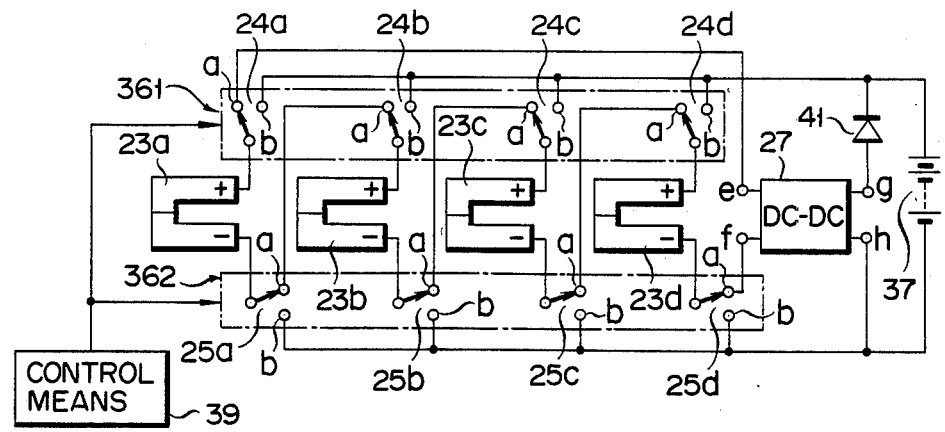
FIG. 3 is a circuit diagram for describing an example to which the above-described thermoelectric generating composite functioning apparatus is applied to a 4-cylinder engine.

A first embodiment of a thermoelectric generating composite functioning apparatus according to the present invention applied to a glow plug used in an internal combustion engine such as a diesel engine will be described in detail with reference to FIG. 1, which shows one side of the apparatus in section, taken along the line X—X. This composite functioning apparatus has N-type and P-type semiconductor elements 11 and 12 formed in the shape of a bar. The elements 11 and 12 are respectively formed by sintered CoSi and $CrSi_2$. The end portions of the elements 11 and 12 are put in contact to form a P-N junction 13. In this case, the end portion of the P-N junction 13 is molded to be converged in a conical shape in a state combined to form the P-N junction 13. An interval is formed between the remaining portions of the elements 11 and 12 so that they do not contact each other.

It is necessary not to decrease the heat resistance and contact resistance of the P-N junction 13 so as to set the composite functioning apparatus thus constructed in a combination chamber of a diesel engine. Thus, the elements 11 and 12 are sintered and simultaneously directly bonded by a hot pressing process or a cold pressing sintering process.

A low thermal conductivity insulator 14 such as forsterite or steatite is filled in the interval between the opposite portions of the elements 11 and 12, except the P-N junction 13, so as not to concentrate a stress to the junction 13.

A thermoelectric generating functioning element 15 is constructed by integrating the elements 11 and 12 as described above. An insulating film 16 is sprayed onto the surface of the functioning element 15. The element 15 thus formed with the film 16 is contained in a housing 17, and brazed to the housing 17. Lead wires 18a and 18b (18a is not shown in FIG. 1) formed of a metal material such as nickel are respectively led from the elements 11 and 12 set in the housing 17. The lead wires 18a and 18b are respectively connected to lead terminals 20 and 21 mounted on a terminal board 19 provided at the base end of the housing 17. Insulating powder 22 such as MgO is filled to hold the positions of and insulate the lead wires 18a and 18b in the housing 17 for containing the lead wires 18a and 18b.

In the thermoelectric generating composite functioning apparatus 23 thus constructed as described above, the P-N junction 13 of the functioning element 15 is used as a glow plug set in a combustion chamber of an internal combustion engine such as a diesel engine. FIG. 2 shows a cylinder in the case that the functioning apparatus 23 is mounted in a diesel engine 30. A main combustion chamber 33 is formed at the upper portion of a cylinder 32, in which a piston 31 is telescopically engaged. A subcombustion chamber 34 is formed continuous with the main chamber 33. Fuel is controllably injected from a fuel injector 35 into the subchamber 34. The P-N junction 13 of the functioning apparatus 23 shown in FIG. 1 is provided in the subchamber 34. In this case, since the functioning apparatus 23 is constructed in the same manner as a glow plug used in an ordinary diesel engine, the apparatus 23 can be mounted in a mounting hole for a conventional glow plug without modifying the engine used heretofore.

Switching means 36 is connected to the functioning apparatus 23 thus mounted in the engine 30. This means 36 provides the electric power generated from the functioning apparatus 23 as charging power to a battery 37 carried near the engine of the vehicle. Means 36 also supplies electric power from the battery 37 to the apparatus 23 to generate heat at the P-N junction 13. Further, temperature detecting means 38, for detecting the temperature in the subchamber 34 by detecting the generated power from the apparatus 23, is connected to the switching means 36.

A switching control signal is supplied from control means 39 to the means 36. A starter signal from a starter switch, (not shown) and an ignition signal from an ignition switch (not shown) are supplied to the means 39. The means 36 supplies power from the battery 37 to the apparatus 23 in the state that the ignition switch is closed to allow the P-N junction 13 to generate heat, thereby preheating the subchamber 34. When the starter switch is closed, the engine is rotatably driven, and fuel is injected and ignited. The switching means 36 interrupts the supply of the power to the apparatus 23 in the state that the engine is started and rotated, and provides on the contrary, power generated from the apparatus 23 and supplies the power to charging voltage generating means 40. The generating means 40 supplies the power generated from the apparatus 23 through a diode 41 to the battery 37 as charging power.

FIG. 3 shows a circuit diagram of the arrangement wherein functioning devices 23a to 23d are respectively mounted in cylinders of a diesel engine having 4-cylinders. Movable switching terminals of changeover switches 24a to 24d and 25a to 25d are respectively connected to terminals corresponding to the terminals 20 and 21 of the devices 23a to 23d mounted in the respective cylinders. The switches 24a to 24d and 25a to 25d respectively form switch circuits 361 to 362 to act as the switching means 36 of FIG. 2. When the switches are closed at the respective contacts "a", the devices 23a to 23d are connected in series. When the switches are closed at the respective contacts "b", the devices 23a to 23d are connected in parallel. Thus, the devices 23a to 23d are energized from the battery 37.

When the engine is intended to be started, the switches 24a to 24d and 25a to 25d of the switch circuits 361 and 362 are contacted at the contact "b" side by a command from the control means 39. Thus, current from the battery 37 flows to the P-N junctions 13, thereby causing the junctions 13 to generate heat by means of Joule heat or Peltier heat. Therefore, the devices 23a to 23d operate as glow plugs mounted in the respective cylinders of the engines, thereby preheating the respective cylinders.

Figure 4:
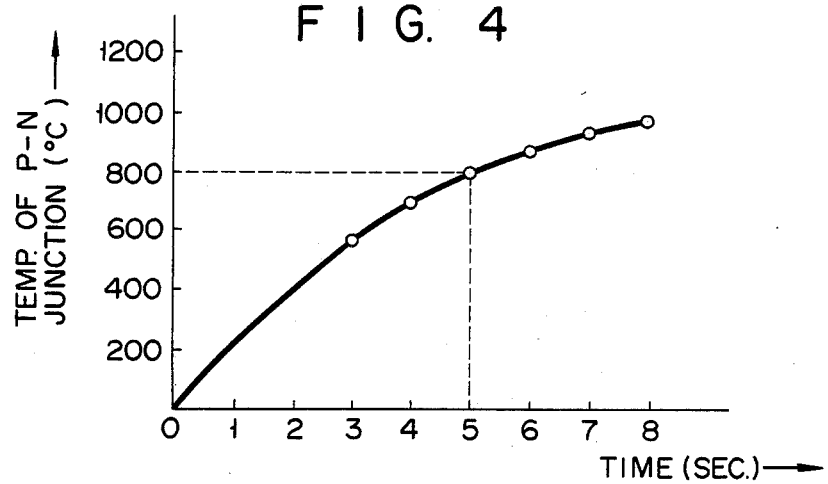
FIG. 4 is a view showing the relationship between the operating characteristics of the above-described thermoelectric generating composite functioning apparatus and the temperature of a P-N junction.

FIG. 4 shows the operating characteristics of the device in the case in which the functioning devices are used as glow plugs. More particularly, the temperature of the junction 13 reaches 800° C. in 5 sec. after energization. It is thus confirmed from this apparatus can provide heating characteristics equivalent to those of glow plug heretofore used in general.

After the devices 23a to 23d operate as glow plugs and the engine is started, the switch circuits 361 and 362 are switched and driven by a command from the control means 39, and the switches 24a to 24d and 25a to 25d are switched to contact at the contacts "a" side. The devices 23a to 23b are connected in series in this state.

The P-N junctions 13 of the devices 23a to 23d are set in the subchamber of the engine in the ignited state when the devices 23a to 23d are connected in series as described above, and the hot contact units corresponding to the junctions 13 of the devices 23a to 23d are mounted to receive a great deal of heat. On the other hand, the portions set in the housings of the devices 23a to 23d are cooled by the engine block to become cold contact units. Thus, thermal electromotive force is generated by the Seebeck effect between electrodes 20 and 21 due to the temperature difference between the hot contact units and the cold contact units. It was confirmed that this thermal electromotive force was approximately 400 mV per one element in the state that the engine is in a fully loaded state. Therefore, a voltage of approximately 1.6 V is generated between the terminals "e" and "f" in the state that the four devices 23a to 23d are connected in series. This generated voltage is raised by the DC/DC converter 27 to be set to produce an output voltage of approximately 14 V between the terminals "g" and "h". The power produced by the converter 27 is supplied to the battery 37 through a reverse current preventing diode 41.

In the thermoelectric generating composite functioning apparatus constructed, as described above, the semiconductor materials of N-type and P-type may include MnSi$_2$, FeSi$_2$ and Si-Ge alloys which are stable at high temperatures.

The electric energy generated, as described above, is not limited to the charging of the battery. For example, the energy may be used as a drive power source for a fan cooling a heated injector when the engine is stopped immediately after the engine is driven at a high speed to charge a large capacity of storage battery. Or, the energy may be effectively used as a power source for a computer for a vehicle. Particularly, when a number of computer controls are employed as in a modern vehicle, the energy may be effectively used as a power source for the computer controls.

Figure 5:
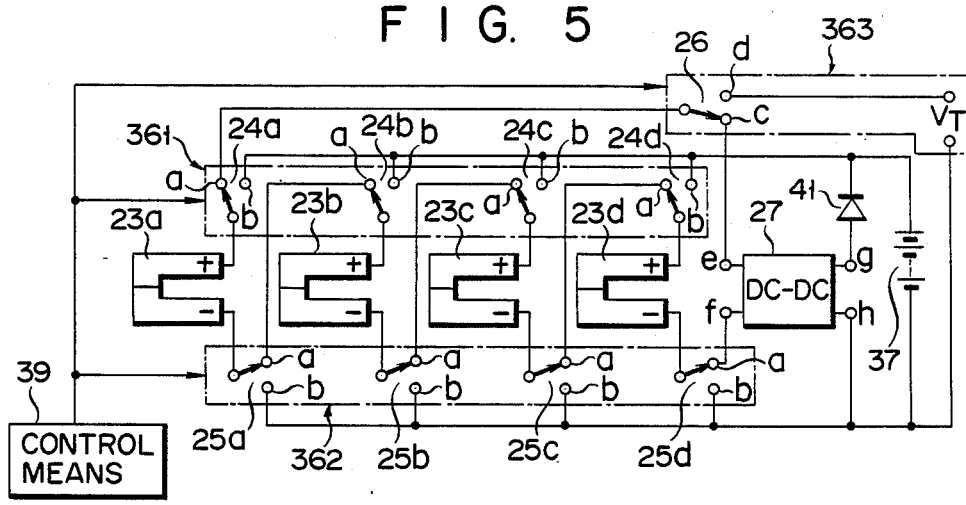
FIG. 5 is a circuit diagram for describing another example to which the above-described thermoelectric generating composite functioning apparatus is applied to a 4-cylinder engine.

FIG. 5 shows another embodiment of thermoelectric generating composite functioning devices applied to a 4-cylinder engine. A changeover switch 26 of a switch circuit 363 is switched by control means 39. The movable contact of the switch 26 is connected to the contact "a" of the switch 24a, and the contact "c" of the switch 26 is connected to an input terminal "e" of a DC/DC converter 27. Electric power generated in a series circuit of the devices 23a to 23d connected in series, is supplied to the converter 27. In other words, the power generated from the devices 23a to 23d charges a battery 37 in the state that the engine is rotated.

When the switch 26 is switched to the contact "d" side by a command from control means 39 in the state that the engine is operated, the power generated from the devices 23a to 23d is outputted as a voltage signal V$_T$ to output terminals 28a and 28b. In this case, the signal V$_T$ corresponds to the thermal electromotive force of the functioning devices, and becomes a temperature detection signal for the combustion chamber of the engine. This signal V$_T$ increases or decreases proportionally to the combustion temperature of the engine and may be effectively used as a monitor signal of the combustion state of the engine. In FIG. 5, the same reference numerals denote the same or equivalent parts in FIG. 3.

What is claimed is:

1. A thermoelectric generating composite functioning apparatus provided in the combustion chamber of a diesel engine, comprising:

N-type and P-type thermoelectric semiconductor elements disposed in parallel and respectively formed in the shape of a bar, and in mutual contact at adjacent end portions of said bars to form a P-N junction located in said combustion chamber;
    a low thermal conductivity insulator interposed between the N-type and P-type thermoelectric semiconductor elements except the P-N junction;
    a housing integrally formed in the state having the P-N junction for containing said N-type and P-type semiconductor elements;
    lead terminals provided in said housing and connected to said N-type and P-type semiconductor elements in said housing; and
    a power source for supplying electric power to said lead terminals to cause said P-N junction to generate heat in said combustion chamber.

2. An apparatus according to claim 1, further including power utilization equipment coupled to said lead terminals for utilizing electric power produced by the P-N junction from heat within said combustion chamber.

3. An apparatus according to claim 1, further including:

a charging circuit, coupled to said power source; and
    a switching circuit coupled to said lead terminals and to said power source and to said charging circuit, for providing electric power to said lead terminals from said power source, and for providing electric power from said lead terminals to said charging circuit.

4. An apparatus according to claim 1, wherein each of said N-type and P-type thermoelectric semiconductor elements include a sintered semiconductor material stable at high temperatures.

5. An apparatus according to claim 1, further including:

charging means coupled to said power source;
    switching means coupled to said lead terminals and said power source and said charging means, for providing electric power from said power source to said lead terminals, and for providing electric power from said lead terminals to said charging means;
    means for providing a command signal indicating the start of said engine; and
    control means for receiving said command signal, and for controlling said switching means in accordance with said command signal.

6. An apparatus according to claim 5, wherein said control means controls said switching means to connect said power source to said P-N junction at the time of starting said engine, and the P-N junction of is controlled to generate heat by a current from said power source.

7. An apparatus according to claim 5, wherein said control means controls said switching means so that said charging means is connected to said P-N junction when said engine is in an operating state, and power generated by the thermoelectric force generated by the P-N junction is supplied as charging power to said power source through said charging means.

8. An apparatus according to claim 7, wherein said charging control means comprises means for raising power generated by the thermal electromotive force by said P-N junction.

9. An apparatus according to claim 1, further including:

switching means coupled to said lead terminals and to said power source for providing electric power from said power source to said lead terminals, and for providing electric power from said lead terminals to said power source; and
    temperature detecting means coupled to said switching means for detecting the temperature of said combustion chamber by receiving electric power from said lead terminals through said switching means.

10. A glow plug provided for combustion chamber of a diesel engine, comprising:

N-type and P-type thermoelectric semiconductor elements respectively formed in the shape of a bar, provided in parallel, and put in mutual contact at the end portions to form a P-N junction;
    a low thermal conductivity insulator interposed between the N-type and P-type thermoelectric semiconductor elements except the P-N junction;
    a housing integrally formed in the state having the P-N junction for containing said N-type and P-type semiconductor elements; and lead terminal means mounted in said housing and connected to said N-type and P-type semiconductor elements in said housing.

11. An apparatus according to claim 10, further including a plurality of glow plugs provided for a pluraltiy of cylinders of the engine, and further including:
   a power source;
   charging means coupled to said power source; and
   switching means coupled to said lead terminals and to said power source and to said charging means, for providing electric power from said power source to said lead terminals, and for connecting said plurality of glow plugs together in parallel when said electric power is supplied from said power source, and for supplying electric power from said lead terminals to said charging means, and for connecting together said glow plugs in series when said electric power is supplied from said lead terminals to said charging means.

12. A thermoelectric device mounted in the combustion chamber of an internal combustion engine, comprising:
   N-type and P-type thermoelectric semiconductor elements arranged substantially in parallel and coupled together at one portion of said elements, said one portion forming a P-N junction disposed inside said combustion chamber;
   a low thermal conductivity insulator interposed between said N-type and P-type thermoelectric elements, except at said P-N junction;
   lead terminals connected to said N-type and P-type semiconductor elements, respectively; and
   switching means for switching said thermoelectric semiconductor elements between a first state where said P-N junction generates electricity from heat in said combustion chamber, and a second state where electricity is provided to said P-N junction to provide heat to said combustion chamber.

13. A device according to claim 12 further including generating means, coupled to said switching means, and adapted for providing electricity generated by said P-N junction to electrical devices associated with said internal combustion engine.

14. A device according to claim 12 further including temperature detecting means, coupled to said switching means, for detecting the thermal electromotive force generated by said P-N junction.

15. A device according to claim 12 further including control means, coupled to said switching means, and adapted to receive a starter switch signal and an ignition switch signal from vehicle controls associated with said internal combustion engine, for switching said P-N junction between said first and second state in response to said starter switch signal and said ignition switch signal.

* * * * *